(12) United States Patent
Jeuk et al.

(10) Patent No.: US 10,855,577 B2
(45) Date of Patent: Dec. 1, 2020

(54) SERVICE TRAFFIC REPLICATION AND DYNAMIC POLICY ENFORCEMENT IN A MULTI-CLOUD SERVICE MESH

(71) Applicant: Cisco Technology, Inc., San Jose, CA (US)

(72) Inventors: Sebastian Jeuk, Munich (DE); Ralf Rantzau, San Jose, CA (US); Gonzalo Salgueiro, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 206 days.

(21) Appl. No.: 16/107,040

(22) Filed: Aug. 21, 2018

(65) Prior Publication Data
US 2020/0067818 A1 Feb. 27, 2020

(51) Int. Cl.
| | | |
|---|---|---|
| *H04L 12/761* | (2013.01) |
| *H04L 12/18* | (2006.01) |
| *H04L 12/54* | (2013.01) |
| *H04L 12/741* | (2013.01) |
| *H04L 12/70* | (2013.01) |

(52) U.S. Cl.
CPC ............ *H04L 45/16* (2013.01); *H04L 12/185* (2013.01); *H04L 12/56* (2013.01); *H04L 45/74* (2013.01); *H04L 2012/5625* (2013.01)

(58) Field of Classification Search
CPC ....... H04L 45/16; H04L 12/185; H04L 12/56; H04L 45/74
See application file for complete search history.

(56) References Cited

U.S. PATENT DOCUMENTS

| | | | | |
|---|---|---|---|---|
| 2005/0204042 A1* | 9/2005 | Banerjee | ............ | H04L 12/6418 709/226 |
| 2015/0131658 A1* | 5/2015 | Wijnands | ............ | H04L 45/7453 370/390 |
| 2015/0181309 A1* | 6/2015 | Shepherd | ........... | H04N 21/6125 725/109 |

(Continued)

OTHER PUBLICATIONS

Giorgetti et. al., "First demonstration of SON-based Bit Index Explicit Replication (BIER) multicasting," 2017 European Conference on Networks and Communications (EUCNC), IEEE, Jun. 12, 2017, 6 pages.

(Continued)

*Primary Examiner* — Chi H Pham
*Assistant Examiner* — Weibin Huang
(74) *Attorney, Agent, or Firm* — Lee & Hayes, P.C.

(57) ABSTRACT

In an embodiment, a data processing method comprises receiving, at a BIER replicator node that is programmed to implement Bit Index Explicit Replication (BIER) protocol, from a data source, a multicast stream packet identifying a service-level multicast group address; using the BIER replicator node, replicating the multicast stream packet according to BIER protocol and transmitting two or more replicated packet streams to two or more BIER receiver nodes that are programmed to implement BIER; using the two or more BIER receiver nodes, transmitting the two or more replicated packet streams to two or more receivers. Other embodiments may use modified iOAM (In-situ Operations, Administration, and Maintenance) techniques.

20 Claims, 3 Drawing Sheets

(56) References Cited

U.S. PATENT DOCUMENTS

| | | | |
|---|---|---|---|
| 2016/0119159 A1* | 4/2016 | Zhao | H04L 12/189 |
| | | | 370/390 |
| 2017/0126481 A1* | 5/2017 | Pignataro | H04L 45/22 |
| 2017/0302546 A1* | 10/2017 | Zheng | H04L 43/00 |
| 2018/0091473 A1 | 3/2018 | Wijnands et al. | |
| 2018/0205636 A1* | 7/2018 | Hu | H04L 45/48 |
| 2018/0331933 A1* | 11/2018 | Song | H04L 29/0653 |
| 2019/0014034 A1* | 1/2019 | Allan | H04L 45/24 |
| 2020/0204401 A1* | 6/2020 | Wei | H04L 12/4633 |

OTHER PUBLICATIONS

PCT Search Report and Written Opinion dated Nov. 5, 2020, for PCT Application No. PCT/US2019/047483, 13 pages.

Shahbaz et. al., "Elmo: Source-Routed Multicast for Cloud Services," Cornell University Library, Feb. 27 2018, 16 pages.

\* cited by examiner

SERVICE TRAFFIC REPLICATION AND DYNAMIC POLICY ENFORCEMENT IN A MULTI-CLOUD SERVICE MESH

FIELD OF THE DISCLOSURE

The present disclosure is in the technical field of computer-implemented micro-services that communicate service requests and responses among one another using packet-switched telecommunications networks and/or multi-cloud networks. Another technical field is multicast packet data communication in which multicast is implemented for Layer 7 services. Another technical field is Bit Index Explicit Replication (BIER) protocol in internetworking. Another technical field is iOAM (In-situ Operations, Administration, and Maintenance) protocol in internetworking and network management.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

In distributed computing systems that use networks, especially those that use cloud or multi-cloud environments, multicast communications between applications and services implemented in software, as opposed to internetworking elements like routers and switches, often is needed. Currently, such one-to-many communication is implemented, if at all, at the application layer. Application programs and/or services are programmed to send repeated unicast application messages from a single source to multiple different recipients. This approach is highly inefficient with respect to use of network resources and bandwidth. It also introduces unnecessary traffic into packet-switched networks, which affects overall device and network performance.

When applications are implemented as services or microservices that have many connections, logically forming a mesh network of services, these problems become acute.

Thus, there is a need to efficiently process multicast traffic for applications. Examples include voice and video applications.

DETAILED DESCRIPTION

Figure 1:
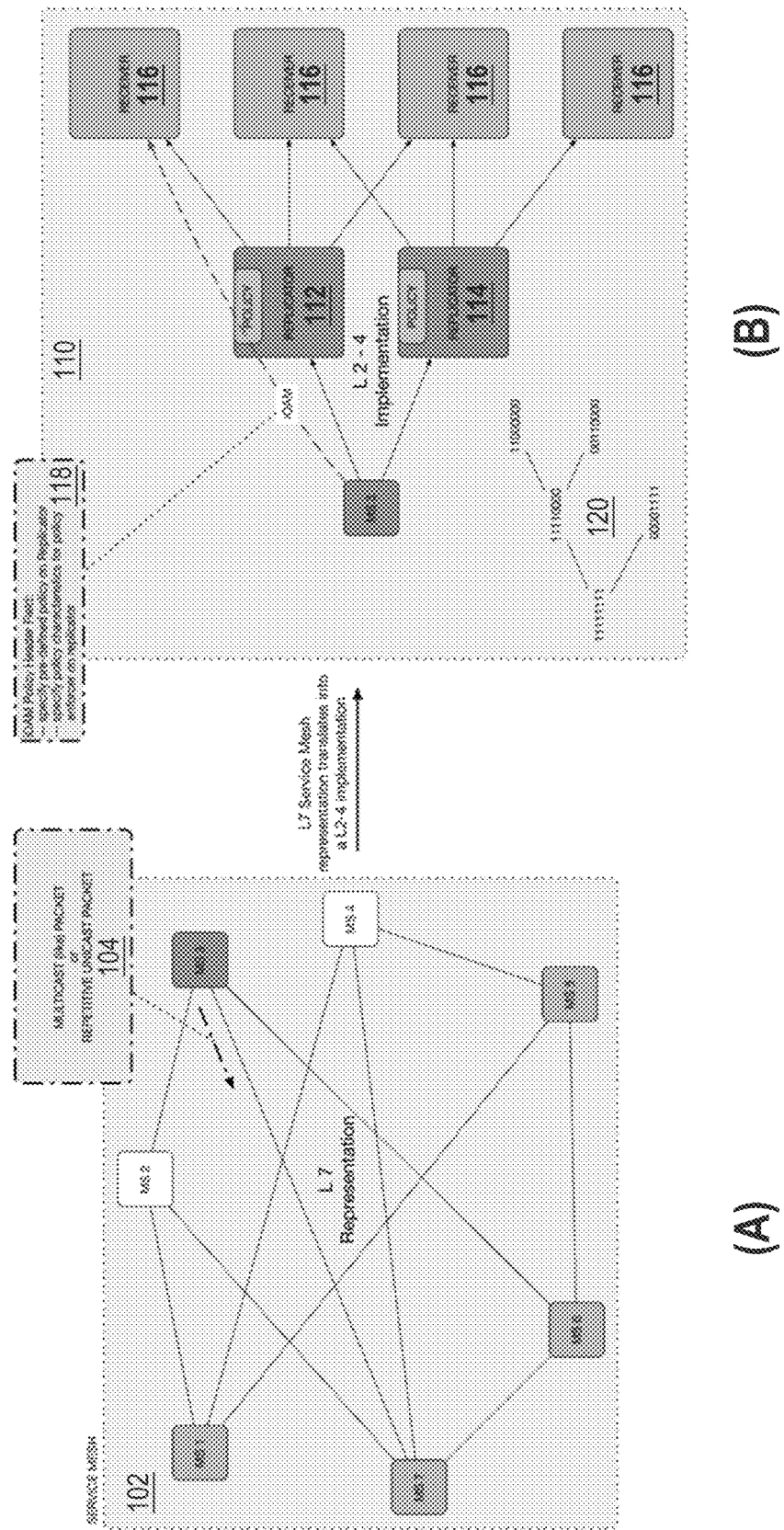
FIG. 1 is a two-part diagram that illustrates a service mesh.

In the following description, for the purposes of explanation, numerous specific details are set forth in order to provide a thorough understanding of the present embodiments. It will be apparent, however, that the present embodiments may be practiced without these specific details. In other instances, well-known structures and devices are shown in block diagram form in order to avoid unnecessarily obscuring the present embodiments. Embodiments are described in sections below according to the following outline:
  General Overview
  Structural Overview
  Functional Overview
  Benefits of Certain Embodiments
  Implementation Example—Hardware Overview General Overview This disclosure provides a digital data processing system and computer-implemented method that is capable of introducing the efficiency of network-layer multicast-like packet delivery within a service mesh. "Service mesh," in this context, refers to a plurality of services or microservices, which may comprise or be components of application programs, that communicate with one another. When each of the services communicates with all other services, a full service mesh may be formed, but is not required in all embodiments. Microservices may support applications, such as voice and video. Furthermore, embodiments use the Bit Index Explicit Replication (BIER) protocol and the iOAM (In-situ Operations, Administration, and Maintenance) protocol to enable multicast-like packet delivery in a service mesh, while also providing the means to deliver in-band definition of forwarding policies. BIER is defined in part in Request for Comments (RFC) 8279, 8296 and RFC 8401 of the Internet Society and managed by the Internet Engineering Task Force.

This disclosure assumes familiarity with and knowledge of the conventional use of BIER and iOAM and focuses on new and unexpected applications of the protocols to a different computing domain. These protocols have not previously been used in a service mesh to enable multicast-like packet delivery while allowing in-band policy selection. BIER headers include an entropy field that is used conventionally to provide simple forwarding adjustments at a replication node. For example, it can be used to color or tag traffic such that traffic tagged with the same entropy value is sent on the same path. However, it has not been used previously to transmit policy definitions, which represents a departure from all previously defined purposes of the header.

In an embodiment, BIER and iOAM are used to enable multicast-like packet delivery within a service mesh, while also providing the means to deliver in-band definition of forwarding policies. Additionally, an iOAM-based mechanism triggers dynamic policy enforcement on BIER replicators. In an embodiment, BIER bitmask traffic distribution is adapted to service mesh deployments. In embodiment, Sidecar functionality is updated to incorporate BIER replicator capabilities. In an embodiment, protocol-independent multicast-like packet delivery across cloud platforms is provided in a manner that is independent of the transport layer. In-band policy delivery using iOAM to replicator functionality within a service mesh is provided. A symbolic policy definition language can carry policy information, ranging from a policy identifier for already defined policies up to complete policy specifications. While certain embodiments are described for use with iOAM, in other embodiments, other metadata-enabled protocols such as SRv6 or NSH may be used for policy delivery in networks other than service mesh networks.

Embodiments have the benefit of not requiring direct support in the network of multicast protocols such as PIM (Protocol Independent Multicast, RFC 7761), mLDP (Multicast Label Distribution Protocol), or RSVP-TE/P2MP (Resource Reservation Protocol—Traffic Engineering, RFC 3209, Point-to-Multipoint RFC 4875).

In an embodiment, a data processing method comprises receiving, at a BIER replicator node that is programmed to implement Bit Index Explicit Replication (BIER) protocol, from a data source, a multicast stream packet identifying a service-level multicast group address; using the BIER replicator node, replicating the multicast stream packet according to BIER protocol and transmitting two or more replicated packet streams to two or more BIER receiver nodes that are programmed to implement BIER; using the two or more BIER receiver nodes, transmitting the two or more replicated packet streams to two or more receivers. Other embodiments may use modified iOAM (In-situ Operations, Administration, and Maintenance) techniques comprising: using the source, encapsulating an iOAM header and placing in the header one of: an identifier of a replicator policy; a definition of a replicator policy expressed in a symbolic language; receiving the iOAM header at one or more of the BIER replicator nodes; at a particular one of the replicator nodes, performing one of: reading the identifier of the replicator policy, retrieving a pre-defined packet replication policy that matches the identifier, and executing the pre-defined packet replication policy to dynamically adjust packet processing behavior of the particular one of the BIER replicator nodes; or parsing the definition of the replicator policy in the symbolic language to yield a new packet replication policy, and executing the new packet replication policy to dynamically adjust packet processing behavior of the particular one of the BIER replicator nodes.

Structural Overview

FIG. 1 is a two-part diagram that illustrates a service mesh. View (A) is a representation of an example service mesh at Layer 7 of the OSI network reference model, and view (B) is an implementation of the same service mesh using internetworking devices and software at Layer 2 to Layer 4. View (A) represents a logical view of how micro-services may interact, but it does not represent the actual implementation in the network to support communicating between the micro-services.

Referring first to view (A), in an embodiment, an example service mesh 102 comprises a plurality of micro-services MS1, MS2, MS3, MS4, MS5, MS6, MS7 that are logically coupled by paths indicated by lines. Each of the micro-services MS1, MS2, MS3, MS4, MS5, MS6, MS7 may comprise a separate computer program, process or other software element. One or more of the micro-services MS1, MS2, MS3, MS4, MS5, MS6, MS7 may relate to the same broader application program and may be instantiated or launched by that program. One of the micro-services such as MS3 communicates with other micro-services by repetitive unicast packets. In an embodiment, multicast-like packets are used.

Turning now to view (B), in an embodiment, the service mesh 102 of view (A) may be implemented in a network using one or more replicator nodes 112, 114 that communicate to one or more receiver nodes 116 over paths indicated by arrows. Each replicator 112, 114 may store policy in memory to govern forwarding operations of the replicator. Both service mesh 102 and implementation 110 may be hosted using routers, switches or other internetworking elements in a public cloud infrastructure, private cloud infrastructure or multi-cloud infrastructure. Implementation in a non-cloud enterprise network or campus network also is possible.

In an embodiment, a particular micro-service such as MS3 may transmit an iOAM message comprising an iOAM policy header field. In one embodiment, the iOAM policy header field may carry a policy identifier that specifies a policy that is already defined and installed on a particular replicator 112, 114. The effect of such a message is to request the replicator 112, 114 that receives the message to load and use the pre-defined policy for forwarding messages originating from the micro-service MS3 and directed to one or more of the receivers 116.

Alternatively, the iOAM policy header field may expressly specify policy characteristics for policy enforcement on a particular replicator 112, 114. The effect of such a message is to request the replicator 112, 114 that receives the message to parse specific policy instructions that are contained in the header field, and to use the parsed policy instructions for forwarding messages originating from the micro-service MS3 and directed to one or more of the receivers 116.

Embodiments may be used to facilitate multicast-like traffic distribution for micro-services in several scenarios. First, one micro-service may operate as a source, with some or all of the remaining micro-services as receivers. Second, multicast traffic may arrive from the outside the service mesh, yet inside the control domain of a cloud computing facility, and needs to be handled by the micro-services within the mesh. Third, a source outside the micro-service mesh and outside the cloud control domain may have micro-services as receivers, such as for management operations.

Figure 2:
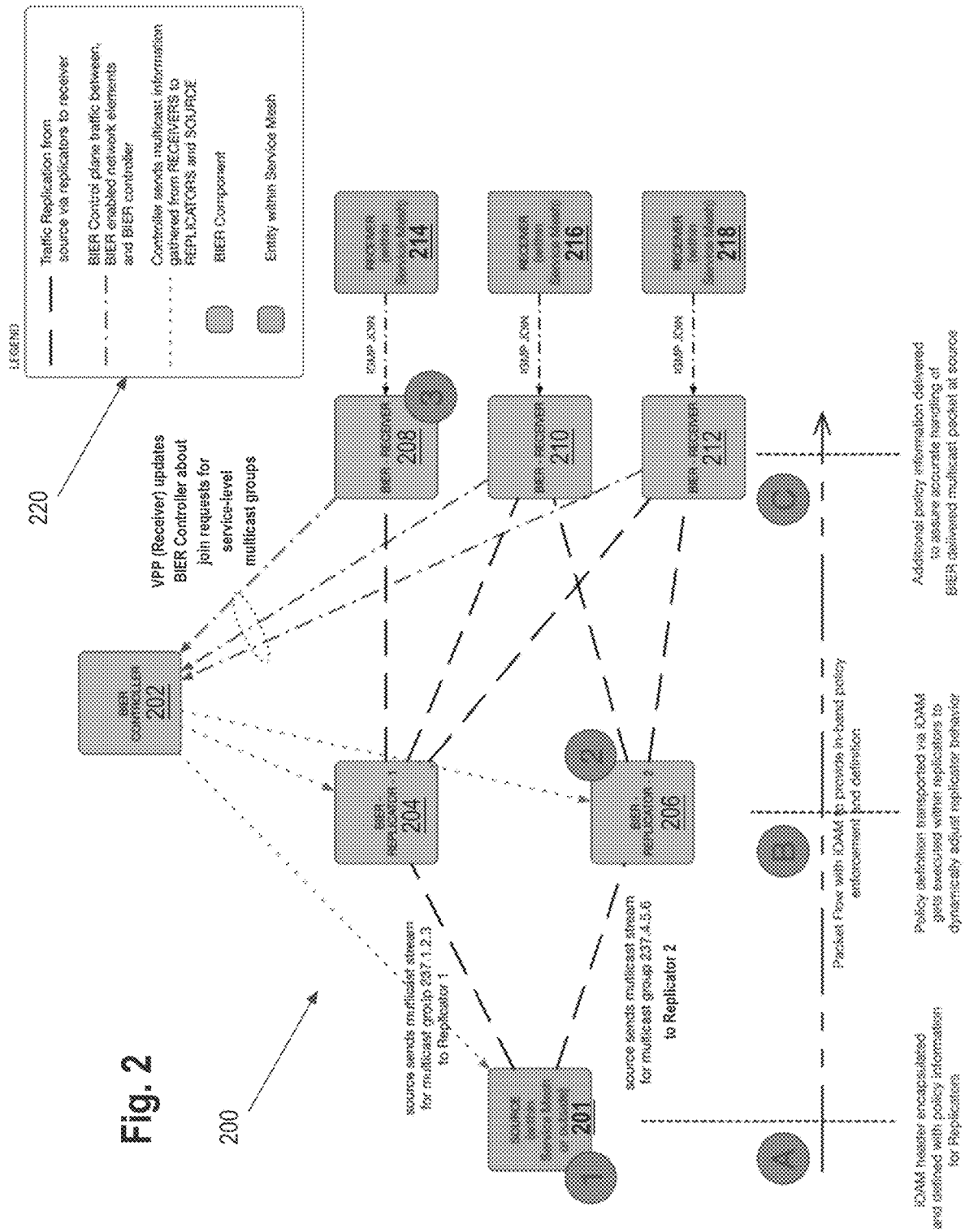
FIG. 2 illustrates a combination of BIER and iOAM operations executing in an example service mesh.

FIG. 2 illustrates a combination of BIER and iOAM operations executing in an example service mesh. In the example of FIG. 2, a service mesh 200 with multicast service messaging comprises a data source 201, which may be hosted within the service mesh 200 or outside it. The data source 201 may comprise a micro-service, an application program, or any other software element that is programmed to transmit messages to any of a plurality of receivers 214, 216, 218. Both data source 201 and receivers 214, 216, 218 may be implemented as individual computers, programs, other software elements, processes or applications.

Service mesh 200 further comprises a BIER controller 202 that is communicatively coupled to one or more BIER replicator nodes 204, 206. The BIER replicator nodes 204, 206 are coupled to one or more BIER receivers 208, 210, 212 and the receivers typically are within the service mesh 200. Each BIER receiver node 208, 210, 212 is uniquely associated with specific receivers among the one or more of the receivers 214, 216, 218 for purposes of local communication. For example, BIER receiver node 208 manages receiver 214, BIER receiver node 210 manages receiver 216, and BIER receiver node 212 manages receiver 218. A particular receiver 214, 216, 218 is associated with and managed by only one BIER receiver node 208, 210, 212. However, a particular BIER receiver node 208, 210, 212 may manage a large number or group of receivers.

In one embodiment, in which containerization software frameworks are used to manage execution of micro-services, each of the BIER controller 202, BIER replicator nodes 204, 206 and the one or more BIER receivers 208, 210, 212 may be implemented using shadow containers that execute in association with main containers that manage the micro-service, in cooperation with a virtualized container framework. For example, proxy containers or extra containers configured to manage aspects of the data plane and control plane traffic may be coupled to or associated with other containers in which micro-services execute. In an embodiment, each of the data source 201 and the receivers 214, 216, 218 executes in a different virtualized container. Examples of virtualized containerization frameworks include DOCKER, APACHE MESOS, RKT, and GARDEN.

Elements in service mesh 200 are logically and/or physically coupled on control and data plane paths that are indicated by arrows and defined in legend 220. Paths indicated by different line styles indicate: traffic replication from the source 201 via the replicator nodes 204, 206 to one or more receivers 214, 216, 218; BIER control plane traffic between BIER-enabled network elements such as receiver nodes 208, 210, 212, and the BIER controller 202, which may include join messages that the receiver nodes received from the receivers 214, 216, 218; and transmission of such multicast information that has been gathered from the receivers 214, 216, 216, such as group membership or join information, to the replicator nodes 204, 206 and the source 201, from the BIER controller 202.

In an embodiment, iOAM messages carried with substantive micro-service messages will trigger policy enforcement on BIER replicator nodes 204, 206. This approach recognizes that in-band policy enforcement on a per-flow basis may be important to a dynamic, on-demand and ever-changing container environment. Statically defined policies on a replicator node 204, 206 may not change fast enough to cope with the dynamic behavior of container environments. However, in an embodiment, a modification of iOAM supports transmission of a policy definition to a replicator node 204, 206. The replicator node 204, 206 then uses the policy definition to enhance BIER forwarding.

Functional Overview

Example operations performed by BIER components are shown in FIG. 2 with numbers 1, 2 and 3, and modified iOAM operations are denoted A, B and C. The BIER operations comprise:

Operation 1. The source 201 prepares data for transmission to two or more receivers 214, 216, 218. For example, assume that the source 201 sends a multicast stream for multicast group 237.1.2.3 to replicator node 204 and sends a multicast stream for multicast group 237.4.5 to replicator node 206. Note that a single source 201 may initiate multiple multicast streams directed to different multicast groups and may direct them to different replicator nodes 204, 206. The source 201 queries the BIER controller 202 to obtain addresses or other forwarding data for one or more of the replicator nodes 204, 206 that are capable of forwarding to receiver nodes 208, 210, 212 that can reach receivers 214, 216, 218. The specific manner by which the source 201 queries the BIER controller 202 and the management of topology data for this purpose is not critical. In an embodiment, based on the information that the source 201 receives from the BIER controller 202, the source forwards one or more packets to a set of replicator nodes 204, 206 within the service mesh. The forwarding is performed using unicast.

Operation 2. Each BIER replicator node 204, 206 executes a replication of the traffic that it receives from the source 201. The replication is based on the bitmask that is defined by the BIER controller 202 based on the receivers 214, 216, 218 for a specific multicast group. Each replicator node 204, 206 uses in-band policy enforcement to dynamically adjust replication operations. Each replicator node 204, 206 may comprise a virtual forwarder engine, virtual switch or other traffic forwarder that allows forwarding traffic based on a vector graph tree or other data structure, and which is programmed to update the BIER controller 202 with information about join requests for multicast groups that originate at receivers 214, 216, 218 and are forwarded from BIER receiver nodes 208, 210, 212 to BIER replicator nodes 204, 206. Examples of virtual forwarders are described at the domain FD.IO on the internet. Vswitch OVS could be used in one embodiment.

Operation 3. Each BIER receiver 208, 210, 212 principally executes two functions. First, each BIER receiver 208, 210, 212 is responsible for performing joins of its locally connected applications requesting multicast packets. "Joins," in this context, may refer to IGMP join operations. After receiving joins, a BIER receiver 208, 210, 212 informs the BIER controller 202 of identifies of specific endpoints that are requesting multicast streams for specified multicast groups. Furthermore, when a BIER receiver 208, 210, 212 receives replicated messages from a BIER replicator node 204, 206, the BIER receiver 208, 210, 212 forwards the replicated messages to those specific receivers 216 that the BIER receiver 208, 210, 212 manages.

The foregoing steps define one embodiment of multicast-like forwarding in a service mesh using BIER principles. In an embodiment, replication of traffic within a service mesh may be optimized using modifications of iOAM. In an embodiment, nodes processing iOAM packets or messages are programmed to load the iOAM header with per-hop policy definitions. In one embodiment, policies are defined using JavaScript Object Notation (JSON) and JSON elements are carried in iOAM headers. The following operations denoted A, B, C in FIG. 2 may be used in one embodiment and illustrate packet flow with modified iOAM to provide in-band policy enforcement and definition.

Operation A. iOAM header is encapsulated and defined with policy information for replicator nodes. The source 201 adds an iOAM header with policy definitions that are valid for a particular packet or flow. The policy is later used across the replicator nodes 204, 206 to define the circumstances under which packets are replicated and forwarded towards receivers 216, or to other replicator nodes that further distribute the packet.

Operation B. Policy definition is transported via iOAM and is executed within the replicator nodes to dynamically adjust the behavior of the replicator nodes. A particular replicator node 204, 206 inspects the policy data. In response to the inspection, the replicator node 204, 206 selects either an installed policy based on a policy identifier, or dynamically and on-the-fly installs policy specified in the iOAM header to be used for the packet or flow and any consecutive packets or flows. Unlike prior approaches using BIER in other contexts, this operation is unique in providing for dynamically reading, installing and leveraging policies based on details transmitted as part of the actual data stream using iIOAM.

Operation C. Additional policy information is delivered to assure accurate handling of BIER delivered multicast packets at the source. At the BIER receiver node 208, 210, 212 that is closest to the edge of the service mesh and thus closest to one or more of the receivers 214, 216, 218, another replicator node (not shown) performs a final replication operation to forward the packet to a specific receiver 214, 216, 218. This receiver is based either within or across different multiple clouds. The other replicator node may be a standalone node or may be incorporated within the BIER receiver node 208, 210, 212.

In one embodiment, the techniques described herein are used in a multi-cloud environment. In such an environment, an implementation cannot rely on feature parity across clouds to deliver multicast packets. Different clouds may not implement all conventional multicast forwarding protocols. In the solution described herein, there is no need for the underlying network to support multicast delivery. Instead, the process described herein can be controlled and enabled by a tenant or administrator of the multi-cloud environment.

In one embodiment, an intelligent controller may automatically determine placement of replicators in cloud networks based on input parameters that may be statically defined or dynamically determined through machine learning. As an example of an automatically machine learned approach, assume that a source 201 located within one cloud network is sending unicast packets to replicator nodes 204, 206 across the two different clouds, based on load balancing or optimization techniques. The packets are then duplicated closest to the receivers, both within the private cloud but also in environments used across public clouds. This approach reduces the unnecessary overhead of bandwidth utilization and provides intelligent and dynamic traffic distribution across multiple clouds. Consequently, embodiments can provide automatic replicator node placement, with awareness of sources and receivers, to provide optimized delivery within a multi-cloud service mesh.

In embodiments, traffic flows can use iOAM headers to carry policy information on a per-replicator basis to dynamically and on-demand adjust traffic forwarding behavior. In one embodiment, policy data is stored in an SDN controller (not shown in FIG. 1, FIG. 2) that manages the BIER-based environment and distributed to the BIER controller 202 periodically. The iOAM header provides useful structure to carry either a policy identifier of pre-defined policies on replicator nodes or to carry definitions of policy requirements that are dynamically applied at the replicator. Policy data can include QoS parameters, SLA information or per-tenant/per-service details.

In one embodiment, the iOAM header specifies policy that is expressed according to a human-readable, symbolic policy definition language that can be parsed and implemented by devices independent of their implementation, vendor, manufacturer or operation model. The policy definition language may provide constructs that can be used to define policy parameters that are relevant to traffic, while also accepting optional arguments such as tenant/service identifiers or timeframes for off-peak/peak hours. TABLE 1 defines an example policy using JSON as a base language:

TABLE 1

EXAMPLE SYMBOLIC POLICY DEFINITION

```
{
    policy": {
        policy-id": <ID>",
        PolicyList": {
            "title": HTTP",
            PolicyListElement": {
            PolicyEntry": {
                "ID": HTTPPolicy",
                "TrafficType": HTTP",
                MultiCastGroup": 239.1.2.3",
                SourceIP": 1.2.3.4",
                ReplicatorPath": <Replicator-ID1, Replicator-ID2,
                Replicator-ID3,
            etc.>,
                PolicyDefinition: {
                    direction": <ingress|egress>,
                    replications: "
                    loadbalancing: "
                    CloudOrigin: "
                },
                PolicyMetadata: {
                    "para": <MetaData relevant for the policy applied at
                    a replicator",
                },
            }
        }
}}
```

While the scope of the invention is defined in the appended claims, based on the foregoing description, at least the techniques of the following numbered clauses have been disclosed:

1. A data processing method comprising receiving, at a BIER replicator node that is programmed to implement Bit Index Explicit Replication (BIER) protocol, from a data source, a multicast stream packet identifying a service-level multicast group address; using the BIER replicator node, replicating the multicast stream packet according to BIER protocol and transmitting two or more replicated packet streams to two or more BIER receiver nodes that are programmed to implement BIER; using the two or more BIER receiver nodes, transmitting the two or more replicated packet streams to two or more receivers.

2. The method of clause 1, further comprising: receiving, at a BIER controller node that is communicatively coupled to the source, the BIER replicator node and the two or more BIER receiver nodes, a query from the source requesting identification of the BIER replicator node that is responsible for forwarding to the an address of the service-level multicast group; based on the address of the service-level multicast group, determining an identification of the BIER replicator node from among a plurality of other BIER replicator nodes; the BIER controller node transmitting a response to the source that provides the identification of the BIER replicator node.

3. The method of clause 1, further comprising, at one or more of the BIER receiver nodes: receiving, from one or more of the receivers, one or more join requests indicating joining the service-level multicast group; transmitting, to a BIER controller node that is communicatively coupled to the two or more BIER receiver nodes, one or more update messages to the BIER controller that identify the one or more join requests.

4. The method of clause 3, further comprising, at the BIER controller, in response to the one or more update messages, transmitting multicast information that has been gathered from the receivers via the two or more BIER receiver nodes to the one or more BIER replicator nodes and to the source.

5. The method of clause 1, wherein each of the source and the receivers comprises a micro-service.

6. The method of clause 1, further comprising: using the source, encapsulating an iOAM (In-situ Operations, Administration, and Maintenance) header and placing in the header one of: an identifier of a replicator policy; a definition of a replicator policy expressed in a symbolic language; receiving the iOAM header at one or more of the BIER replicator nodes; at a particular one of the replicator nodes, performing one of: reading the identifier of the replicator policy, retrieving a pre-defined packet replication policy that matches the identifier, and executing the pre-defined packet replication policy to dynamically adjust packet processing behavior of the particular one of the BIER replicator nodes; or parsing the definition of the replicator policy in the symbolic language to yield a new packet replication policy, and executing the new packet replication policy to dynamically adjust packet processing behavior of the particular one of the BIER replicator nodes.

7. The method of clause 1, further comprising: using the source, encapsulating an iOAM (In-situ Operations, Administration, and Maintenance) header and placing in the header a definition of a replicator policy expressed in a symbolic language; receiving the iOAM header at one or more of the BIER replicator nodes; at a particular one of the replicator nodes: parsing the definition of the replicator policy in the symbolic language to yield a new packet replication policy, and executing the new packet replication policy to dynamically adjust packet processing behavior of the particular one of the BIER replicator nodes; transmitting policy information derived from the new packet replication policy to one or more of the BIER receiver nodes.

8. The method of clause 1, wherein the receivers are computers.

Benefits of Certain Embodiments

Embodiments improve digital data communication services between software elements operating as micro-services and communicating with one another in complex topologies such as service meshes. In particular, embodiments enable a source, such as a micro-service or other program, to transmit a stream of messages relating to an application using multicast-like techniques even though the micro-services are logically defined in a mesh at Layer 7 of the OSI reference model rather than Layer 2, Layer 3 or Layer 4. Rather than use or require the use of conventional IP multicast protocols, which may not be present in all networks or not implemented across clouds, the new techniques herein use a BIER controller, BIER replicator nodes and BIER receiver nodes to replicate, receive, and forward application or service traffic to receivers that have joined service multicast groups. Furthermore, the BIER receivers receive IGMP join messages from receivers and update replicator nodes, which then update the BIER controller. This improvement permits large, complex meshes of micro-service programs to communicate efficiently without having to use repetitive unicast messages. The result is that fewer messages traverse all links of the network and fewer CPU cycles, less memory and storage are needed for a single source to reach a large number of receivers.

Embodiments also provide for dynamic distribution of replicator policy, using the iOAM header in a new and previously undefined way to carry either a policy identifier or a policy definition in a symbolic language. This approach allows close coupling of policy to traffic and also carries policy identifiers or definitions in a manner that is efficient and does not require defining a new protocol, new field in a protocol, or new message set. Instead, existing implementations of iOAM encapsulation and de-encapsulation, which exist in network nodes for purposes other than policy definition for service mesh multicast traffic, can be reused in a new way to carry policy for this traffic.

Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 3:
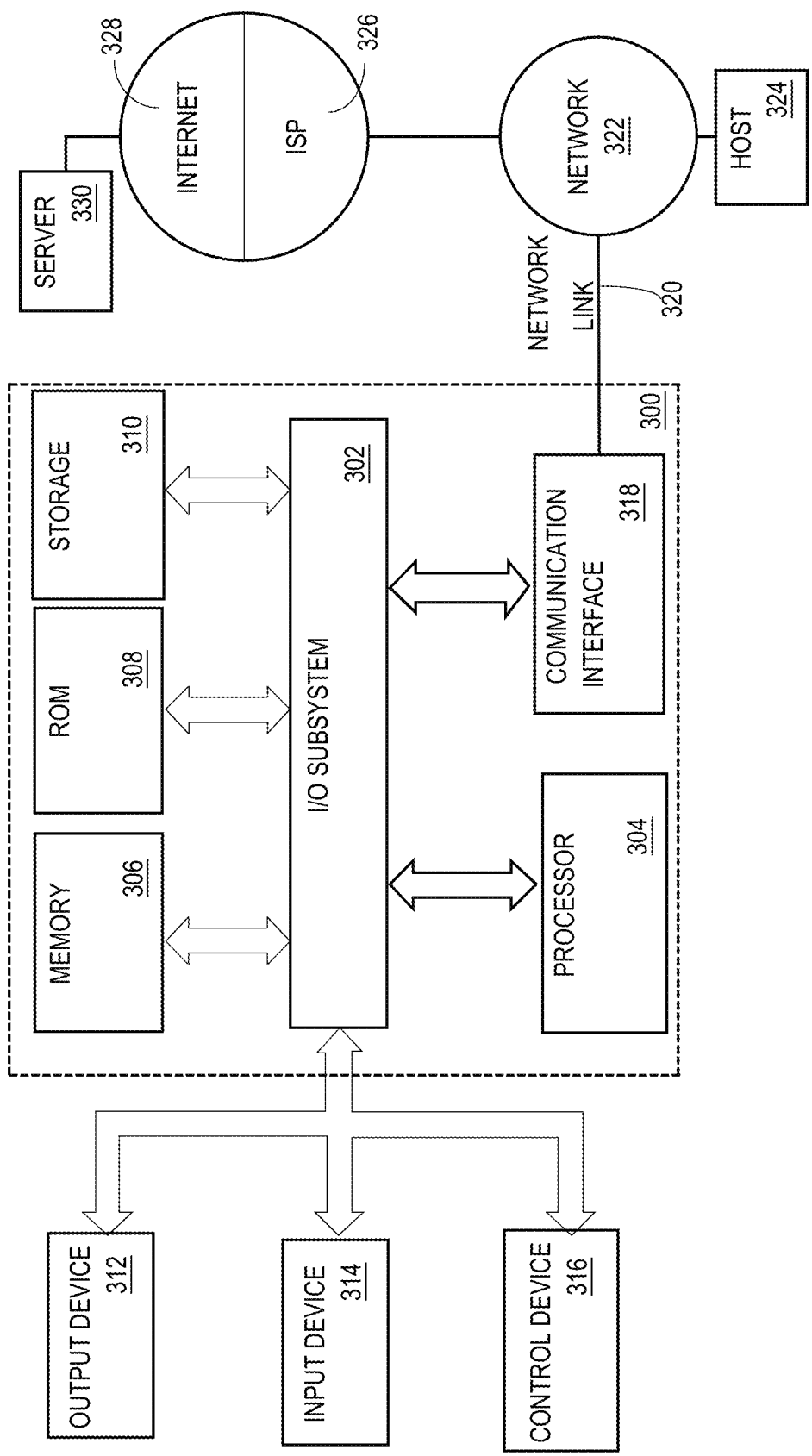
FIG. 3 is a block diagram that illustrates an example computer system with which an embodiment may be implemented.

FIG. 3 is a block diagram that illustrates an example computer system with which an embodiment may be implemented. In the example of FIG. 3, a computer system 300 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 300 includes an input/output (I/O) subsystem 302 which may include a bus and/or other communication mechanism(s) for communicating information and/or instructions between the components of the computer system 300 over electronic signal paths. The I/O subsystem 302 may include an I/O controller, a memory controller and at least one I/O port. The electronic signal paths are represented schematically in the drawings, for example as lines, unidirectional arrows, or bidirectional arrows.

At least one hardware processor 304 is coupled to I/O subsystem 302 for processing information and instructions. Hardware processor 304 may include, for example, a general-purpose microprocessor or microcontroller and/or a special-purpose microprocessor such as an embedded system or a graphics processing unit (GPU) or a digital signal processor or ARM processor. Processor 304 may comprise an integrated arithmetic logic unit (ALU) or may be coupled to a separate ALU.

Computer system 300 includes one or more units of memory 306, such as a main memory, which is coupled to I/O subsystem 302 for electronically digitally storing data and instructions to be executed by processor 304. Memory 306 may include volatile memory such as various forms of random-access memory (RAM) or other dynamic storage device. Memory 306 also may be used for storing temporary variables or other intermediate information during execution of instructions to be executed by processor 304. Such instructions, when stored in non-transitory computer-readable storage media accessible to processor 304, can render computer system 300 into a special-purpose machine that is customized to perform the operations specified in the instructions.

Computer system 300 further includes non-volatile memory such as read only memory (ROM) 308 or other static storage device coupled to I/O subsystem 302 for storing information and instructions for processor 304. The ROM 308 may include various forms of programmable ROM (PROM) such as erasable PROM (EPROM) or electrically erasable PROM (EEPROM). A unit of persistent storage 310 may include various forms of non-volatile RAM (NVRAM), such as FLASH memory, or solid-state storage, magnetic disk or optical disk such as CD-ROM or DVD-ROM, and may be coupled to I/O subsystem 302 for storing information and instructions. Storage 310 is an example of a non-transitory computer-readable medium that may be used to store instructions and data which when executed by the processor 304 cause performing computer-implemented methods to execute the techniques herein.

The instructions in memory 306, ROM 308 or storage 310 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 300 may be coupled via I/O subsystem 302 to at least one output device 312. In one embodiment, output device 312 is a digital computer display. Examples of a display that may be used in various embodiments include a touch screen display or a light-emitting diode (LED) display or a liquid crystal display (LCD) or an e-paper display. Computer system 300 may include other type(s) of output devices 312, alternatively or in addition to a display device. Examples of other output devices 312 include printers, ticket printers, plotters, projectors, sound cards or video cards, speakers, buzzers or piezoelectric devices or other audible devices, lamps or LED or LCD indicators, haptic devices, actuators or servos.

At least one input device 314 is coupled to I/O subsystem 302 for communicating signals, data, command selections or gestures to processor 304. Examples of input devices 314 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 316, which may perform cursor control or other automated control functions such as navigation in a graphical interface on a display screen, alternatively or in addition to input functions. Control device 316 may be a touchpad, a mouse, a trackball, or cursor direction keys for communicating direction information and command selections to processor 304 and for controlling cursor movement on output device (e.g., display) 312. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 314 may include a combination of multiple different input devices, such as a video camera and a depth sensor.

In another embodiment, computer system 300 may comprise an internet of things (IoT) device in which one or more of the output device 312, input device 314, and control device 316 are omitted. Or, in such an embodiment, the input device 314 may comprise one or more cameras, motion detectors, thermometers, microphones, seismic detectors, other sensors or detectors, measurement devices or encoders and the output device 312 may comprise a special-purpose display such as a single-line LED or LCD display, one or more indicators, a display panel, a meter, a valve, a solenoid, an actuator or a servo.

When computer system 300 is a mobile computing device, input device 314 may comprise a global positioning system (GPS) receiver coupled to a GPS module that is capable of triangulating to a plurality of GPS satellites, determining and generating geo-location or position data such as latitude-longitude values for a geophysical location of the computer system 300. Output device 312 may include hardware, software, firmware and interfaces for generating position reporting packets, notifications, pulse or heartbeat signals, or other recurring data transmissions that specify a position of the computer system 300, alone or in combination with other application-specific data, directed toward host 324 or server 330.

Computer system 300 may implement the techniques described herein using customized hard-wired logic, at least one ASIC, GPU, or FPGA, firmware and/or program instructions or logic which when loaded and used or executed in combination with the computer system causes or programs the computer system to operate as a special-purpose machine. According to one embodiment, the techniques herein are performed by computer system 300 in response to processor 304 executing at least one sequence of at least one instruction contained in main memory 306. Such instructions may be read into main memory 306 from another storage medium, such as storage 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 310. Volatile media includes dynamic memory, such as memory 306. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 302. Transmission media can also take the form of acoustic or light waves, such as those generated during radio-wave and infra-red data communications.

Various forms of media may be involved in carrying at least one sequence of at least one instruction to processor 304 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 300 can receive the data on the communication link and convert the data to a format that can be read by computer system 300. For instance, a receiver such as a radio frequency antenna or an infrared detector can receive the data carried in a wireless or optical signal and appropriate circuitry can provide the data to I/O subsystem 302 such as place the data on a bus. I/O subsystem 302 carries the data to memory 306, from which processor 304 retrieves and executes the instructions. The instructions received by memory 306 may optionally be stored on storage 310 either before or after execution by processor 304.

Computer system 300 also includes a communication interface 318 coupled to bus 302. Communication interface 318 provides a two-way data communication coupling to network link(s) 320 that are directly or indirectly connected to at least one communication networks, such as a network 322 or a public or private cloud on the Internet. For example, communication interface 318 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 322 broadly represents a local area network (LAN), wide-area network (WAN), campus network, internetwork or any combination thereof. Communication interface 318 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 318 sends and receives electrical, electromagnetic or optical signals over signal paths that carry digital data streams representing various types of information.

Network link 320 typically provides electrical, electromagnetic, or optical data communication directly or through at least one network to other data devices, using, for example, satellite, cellular, Wi-Fi, or BLUETOOTH technology. For example, network link 320 may provide a connection through a network 322 to a host computer 324.

Furthermore, network link 320 may provide a connection through network 322 or to other computing devices via internetworking devices and/or computers that are operated by an Internet Service Provider (ISP) 326. ISP 326 provides data communication services through a world-wide packet data communication network represented as internet 328. A server computer 330 may be coupled to internet 328. Server 330 broadly represents any computer, data center, virtual machine or virtual computing instance with or without a hypervisor, or computer executing a containerized program system such as DOCKER or KUBERNETES. Server 330 may represent an electronic digital service that is implemented using more than one computer or instance and that is accessed and used by transmitting web services requests, uniform resource locator (URL) strings with parameters in HTTP payloads, API calls, app services calls, or other service calls. Computer system 300 and server 330 may form elements of a distributed computing system that includes other computers, a processing cluster, server farm or other organization of computers that cooperate to perform tasks or execute applications or services. Server 330 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 330 may comprise a web application server that hosts a presentation layer, application layer and data storage layer such as a relational database system using structured query language (SQL) or no SQL, an object store, a graph database, a flat file system or other data storage.

Computer system 300 can send messages and receive data and instructions, including program code, through the network(s), network link 320 and communication interface 318. In the Internet example, a server 330 might transmit a requested code for an application program through Internet 328, ISP 326, local network 322 and communication interface 318. The received code may be executed by processor 304 as it is received, and/or stored in storage 310, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 304. While each processor 304 or core of the processor executes a single task at a time, computer system 300 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

What is claimed is:
1. A method comprising:
  receiving, at a Bit Index Replication (BIER) replicator node that is configured to implement a BIER protocol, an In-situ Operations, Administration, and Maintenance (iOAM) header that indicates a replicator policy;

receiving, at the BIER replicator node, from a data source that implements an application layer micro-service, a multicast stream packet identifying a service-level multicast group address of a service-level multicast group;

determining that the replicator policy indicates that the multicast stream packet is to be replicated;

replicating, via the BIER replicator node, the multicast stream packet according to the BIER protocol;

transmitting, via the BIER replicator node, two or more replicated multicast stream packets to two or more BIER receiver nodes that are configured to implement BIER; and transmitting, via the two or more BIER receiver nodes, the two or more replicated multicast stream packets to two or more receivers.

2. The method of claim 1, further comprising:

receiving, at a BIER controller node that is communicatively coupled to the data source, the BIER replicator node and the two or more BIER receiver nodes, a query from the data source requesting identification of the BIER replicator node that is responsible for forwarding traffic to an address of the service-level multicast group;

based on the address of the service-level multicast group, identifying the BIER replicator node from among a plurality of other BIER replicator nodes; and transmitting, via the BIER controller node, a response to the source that provides the identification of the BIER replicator node.

3. The method of claim 1, further comprising:

receiving, at one or more of the BIER receiver nodes and from one or more of the receivers, one or more join requests indicative of joining the service-level multicast group; and transmitting, via the one or more of the BIER receiver nodes and to a BIER controller node that is communicatively coupled to the two or more BIER receiver nodes, one or more update messages to the BIER controller identifying the one or more join requests.

4. The method of claim 3, further comprising, in response to the one or more update messages, transmitting, via the BIER controller, multicast information that has been gathered from the receivers by the two or more BIER receiver nodes to the one or more BIER replicator nodes and to the source.

5. The method of claim 1, further comprising:

executing the replication policy to dynamically adjust packet processing behavior of the BIER replicator node; or parsing the replicator policy to yield a new packet replication policy, and executing the new packet replication policy to dynamically adjust packet processing behavior of the BIER replicator node.

6. The method of claim 5, further comprising transmitting policy information derived from the new packet replication policy to one or more of the BIER receiver nodes.

7. The method of claim 1, wherein each of the receivers comprises a micro-service.

8. The method of claim 1, wherein the data source and each of the receivers executes in a virtualized container.

9. A computer system comprising:

a Bit Index Explicit Replication (BIER) replicator node that is configured to implement a BIER protocol and is programmed to:

receive an In-situ Operations, Administration, and Maintenance (iOAM) header that indicates a replicator policy;

receive from a data source that implements an application layer micro-service, a multicast stream packet identifying a service-level multicast group address of a service-level multicast group;

determine that the replicator policy indicates that the multicast stream packet is to be replicated;

replicate the multicast stream packet according to the BIER protocol; and transmit two or more replicated multicast stream packets to two or more BIER receiver nodes that are configured to implement BIER; and the two or more BIER receiver nodes being programmed to transmit the two or more replicated multicast stream packets to two or more receivers.

10. The computer system of claim 9, further comprising a BIER controller node that is communicatively coupled to the data source and that is programmed to receive, from the BIER replicator node and the two or more BIER receiver nodes, a query from the data source requesting identification of the BIER replicator node that is responsible for forwarding traffic to an address of the service-level multicast group; to identify the BIER replicator node from among a plurality of other BIER replicator nodes based on the address of the service-level multicast group; to transmit, via the BIER controller node, a response to the source that provides the identification of the BIER replicator node.

11. The computer system of claim 9, wherein the BIER receiver nodes are further programmed to receive, from one or more of the receivers, one or more join requests indicative of joining the service-level multicast group, and to transmit, to a BIER controller node that is communicatively coupled to the two or more BIER receiver nodes, one or more update messages to the BIER controller identifying the one or more join requests.

12. The computer system of claim 10, wherein the BIER controller is further programmed to transmit, in response to the one or more update messages, multicast information that has been gathered from the receivers by the two or more BIER receiver nodes to the one or more BIER replicator nodes and to the source.

13. The computer system of claim 9, wherein the BIER replicator node is programmed to execute the replication policy to dynamically adjust packet processing behavior of the the BIER replicator node; or to parse the replicator policy to yield a new packet replication policy, and to execute the new packet replication policy to dynamically adjust packet processing behavior of the BIER replicator node.

14. The computer system of claim 13, wherein the the BIER replicator node is further programmed to transmit policy information derived from the new packet replication policy to one or more of the BIER receiver nodes.

15. The computer system of claim 9, wherein each of the receivers comprises a micro-service.

16. The computer system of claim 9, wherein the data source and each of the receivers executes in a virtualized container.

17. One or more non-transitory computer-readable storage media storing one or more sequences of instructions which when executed using one or more processors causes performing:

receiving, at a Bit Index Replication (BIER) replicator node that is configured to implement a BIER protocol, an In-situ Operations, Administration, and Maintenance (iOAM) header that indicates a replicator policy;

receiving, at the BIER replicator node, from a data source that implements an application layer micro-service, a multicast stream packet identifying a service-level multicast group address of a service-level multicast group;

determining that the replicator policy indicates that the multicast stream packet is to be replicated;

replicating, via the BIER replicator node, the multicast stream packet according to the BIER protocol;

transmitting, via the BIER replicator node, two or more replicated multicast stream packets to two or more BIER receiver nodes that are configured to implement BIER; and transmitting, via the two or more BIER receiver nodes, the two or more replicated multicast stream packets to two or more receivers.

18. The non-transitory computer-readable storage media of claim 17, further comprising sequences of instructions which when executed cause:

receiving, at a BIER controller node that is communicatively coupled to the data source, the BIER replicator node and the two or more BIER receiver nodes, a query from the data source requesting identification of the BIER replicator node that is responsible for forwarding traffic to an address of the service-level multicast group;

based on the address of the service-level multicast group, identifying the BIER replicator node from among a plurality of other BIER replicator nodes; and transmitting, via the BIER controller node, a response to the source that provides the identification of the BIER replicator node.

19. The non-transitory computer-readable storage media of claim 17, further comprising sequences of instructions which when executed cause:

receiving, at one or more of the BIER receiver nodes and from one or more of the receivers, one or more join requests indicative of joining the service-level multicast group; and transmitting, via the one or more of the BIER receiver nodes and to a BIER controller node that is communicatively coupled to the two or more BIER receiver nodes, one or more update messages to the BIER controller identifying the one or more join requests.

20. The non-transitory computer-readable storage media of claim 17, further comprising sequences of instructions which when executed cause:

executing the replication policy to dynamically adjust packet processing behavior of the BIER replicator node; or parsing the replicator policy to yield a new packet replication policy, and executing the new packet replication policy to dynamically adjust packet processing behavior of the BIER replicator node.

* * * * *